C. S. Stearns.
Cutting Leather.
No. 3,987. Reissued May 24. 1870
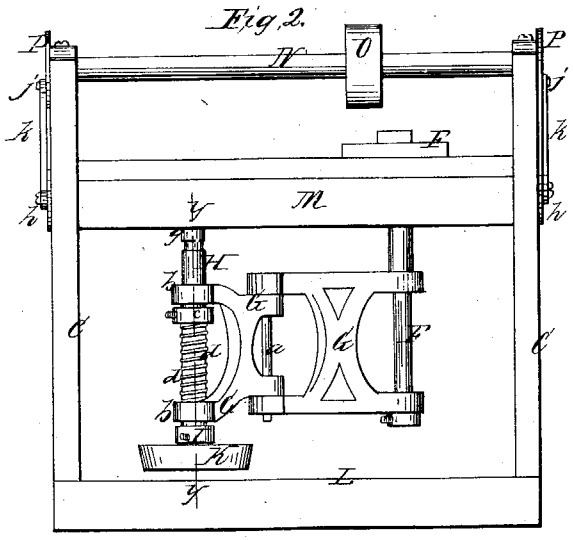
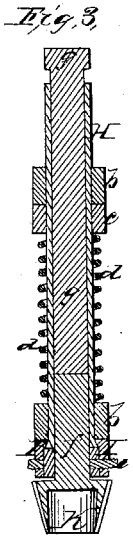
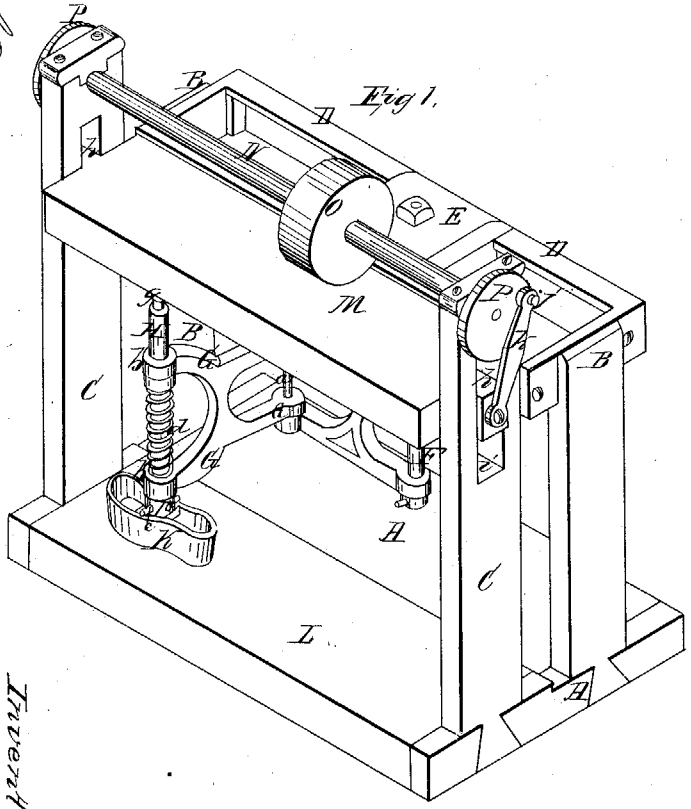
Witnesses.
D. C. Schumacher
W. J. Cambridge
Inventor
Caleb S. Stearns
N. PETERS, PHOTO-LITHOGRAPHER, WASHINGTON, D. C.

United States Patent Office.

CHARLES F. DAVIS, THOMAS COREY, SAMUEL BOYD, AND ROGER BOYD, OF MARLBOROUGH, MASSACHUSETTS, ASSIGNEES OF CALEB S. STEARNS.

*Letters Patent No.* 58,315, *dated September* 25, 1866; *reissue No.* 3,987, *dated May* 24, 1870.

IMPROVED MACHINE FOR CUTTING LEATHER.

The Schedule referred to in these Letters Patent and making part of the same.

*To all whom it may concern:*

Be it known that CALEB S. STEARNS, of Marlborough, in the county of Middlesex and State of Massachusetts, did invent an Improved Machine for Cutting Leather, &c., of which the following is a full, clear, and exact description, reference being had to the accompanying drawings making part of this specification, in which—

Figure 1 is a perspective view of his improved machine for cutting leather.

Figure 2 is a side elevation of the same.

Figure 3 is a section through the die and its shaft, on the line *y y* of fig. 2.

Machines have been constructed for the purpose of cutting out soles of boots and shoes, and other articles, in which the die was attached to the end of a vertical shaft, working up and down in stationary bearings. This necessitated the cutting of the leather into long strips, which were moved along under the die; but with this method a considerable waste of leather was occasioned, as the die was always brought down vertically in the same place, and could not be moved so as to cut in the exact spot required, and, on this account, the ordinary hand-die, which is struck with a mallet, is generally preferred.

This invention has for its object to overcome this objection, and consists in a movable or sliding frame, in combination with a presser-block, or equivalent device, by which the cutting-die is made to cut the leather, on any portion of the table, without unnecessary waste, the leather being spread out upon the table, and not cut into strips, as heretofore.

To enable others skilled in the art to understand and use this invention, the manner in which it is carried out will now be described.

In the said drawings—

A is the bed of the machine, from which rise the standards B C, the former of which supports the frame D.

E is a block, which is grooved on each side, and fitted to slide back and forth in the frame D, and to this block is secured a shaft, F, to which is attached, so that it will swing freely in any direction, the frame G.

This frame is jointed in the center at *a*, and its outer end is bifurcated, forming bearings *b* for a vertical hollow shaft, H, which slides up and down, and is provided with a collar, *c*, between which and the lower bearing *b* it is surrounded by a spiral spring, *d*, by which it is retained in the position seen in figs. 1 and 2, the collar *c* serving as a stop.

I is a collar, which is so attached to the lower end of the hollow shaft H that it will swivel around freely thereon, and to this collar I is secured, by means of a set-screw, *e*, the cutting-out die K, the spindle *f* of which passes up into the hollow shaft H; and on top of this spindle *f* rests a rod, *g*, of such a diameter that it will slide freely within the hollow shaft. The die can thus be revolved around freely in any direction, as required.

The manner in which the die K is brought down onto the leather or other material which is placed upon the table L will now be described.

M is a presser-block, the surface of which nearly corresponds to that of the table L, and from the ends of this block project the guides *h*, which slide up and down in slots *i* in the standard C.

N is a horizontal shaft, which runs in bearings in the standard C, and carries the driving-pulley O; and at each end, outside the bearings, a disk, P, from which projects a crank-pin, *j*, which is connected with the guide *h* by means of a rod, *k*, and thus, as the shaft N is revolved, the presser-block M is carried down so as to strike the top of the rod *g*, and press the die through the leather or other material on the table, the area of the under surface of the presser-block being such that it will strike the rod *g* whenever the whole of the die is over the table L.

It will be seen that the pressure of the rod *g* is exerted directly over the center of the die, thus avoiding all liability of straining the swiveling collar I.

The length of the rod *g* may be varied to correspond to the length of the spindle of the die employed, and thus insure the die being brought down sufficiently to cut through the material on the table L.

When the presser-block M is raised, the spring *d* draws up the die K, and retains it above the leather, so that the operator, by taking hold of the swinging frame G, can move the die at pleasure over any portion of the leather, and bring it down into the exact position required to cut without unnecessary waste.

Instead of the swiveling-die being attached to a swinging frame, it may be secured to a frame so arranged as to slide in different directions to bring the die over any portion of the table required, without departing from the spirit of this invention, and, instead of hanging the die to a movable frame, it may, if preferred, be detached therefrom, the die being taken up in the hand and placed upon that portion of the leather which it is desired to cut, and the movable frame then brought down upon it to force it through the leather.

In the machine above described the die K is for cutting out the soles of boots and shoes, but dies of other forms, for cutting out various articles, may be used instead.

It will be seen that, with the above-described machine, the leather or other material can be cut as economically as with a hand-die, while the operation can be performed much more rapidly, thus effecting a great saving of time, stock, and labor.

*Claims.*

What we claim as the invention of the said CALEB S. STEARNS, and desire to secure by Letters Patent, is—

A movable or sliding frame, in combination with a presser-block, M, or equivalent device, by which the cutting-die in a leather-cutting machine is made to cut the leather, substantially as set forth.

Also, the hollow shaft H with its swiveling collar I, the die K, and the rod *g*, in combination with the movable arm G, substantially as and for the purpose described.

Witness our hands this 2d day of May, A. D. 1870.

CHARLES F. DAVIS.
THOMAS COREY.
SAMUEL BOYD.
ROGER BOYD.

Witnesses:
P. E. TESCHEMACHER.
N. W. STEARNS.